United States Patent
Zhang et al.

(10) Patent No.: US 11,962,615 B2
(45) Date of Patent: Apr. 16, 2024

(54) INFORMATION SECURITY SYSTEM AND METHOD FOR DENIAL-OF-SERVICE DETECTION

(71) Applicant: Bank of America Corporation, Charlotte, NC (US)

(72) Inventors: Xiao Jun Zhang, Irvine, CA (US); Neetika Singh, Simi Valley, CA (US); Jesse Deping Meng, San Jose, CA (US); Robert Bruce Williams, Mission Viejo, CA (US); Joshua Samuel Drucker, Maricopa, AZ (US); Cynthia Diane Dieterich, Wrightwood, CA (US)

(73) Assignee: Bank of America Corporation, Charlotte, NC (US)

( * ) Notice: Subject to any disclaimer, the term of this patent is extended or adjusted under 35 U.S.C. 154(b) by 343 days.

(21) Appl. No.: 17/383,862

(22) Filed: Jul. 23, 2021

(65) Prior Publication Data
US 2023/0029251 A1    Jan. 26, 2023

(51) Int. Cl.
H04L 9/40    (2022.01)
(52) U.S. Cl.
CPC ...... H04L 63/1458 (2013.01); H04L 63/1416 (2013.01)
(58) Field of Classification Search
CPC .. H04L 63/08; H04L 63/1416; H04L 63/1458
See application file for complete search history.

(56) References Cited

U.S. PATENT DOCUMENTS

| | | | |
|---|---|---|---|
| 6,851,062 B2 | 2/2005 | Hartmann et al. |
| 7,107,619 B2 | 9/2006 | Silverman |
| 7,372,809 B2 | 5/2008 | Chen et al. |
| 7,411,957 B2 | 8/2008 | Stacy et al. |
| 7,426,634 B2 | 9/2008 | Jain |
| 7,526,807 B2 | 4/2009 | Chao et al. |
| 7,685,299 B2 | 3/2010 | Katz et al. |
| 7,725,602 B2 | 5/2010 | Liu et al. |
| 7,921,462 B2 | 4/2011 | Rooney et al. |
| 7,953,855 B2 | 5/2011 | Jayawardena et al. |
| 7,996,544 B2 | 8/2011 | Jakubik et al. |
| 8,089,871 B2 | 1/2012 | Iloglu et al. |
| 8,272,044 B2 | 9/2012 | Ansari et al. |
| 8,321,955 B2 | 11/2012 | Feng et al. |
| 8,397,284 B2 | 3/2013 | Kommareddy et al. |

(Continued)

*Primary Examiner* — Daniel B Potratz
*Assistant Examiner* — Matthias Habtegeorgis (57) ABSTRACT

A system for detecting Denial-of-Service (DoS) attacks on one or more user profiles collects a number of invalid sign-on attempts on the one or more user profiles during every time interval. The system determines a number of invalid sign-on attempts on every user profile since the start of the first time interval. The system detects a first DoS attack on a particular user profile if a first number of invalid sign-on attempts on the particular user profile exceeds a single-user profile. The system detects a second DoS attack on multiple user profiles during the first time interval if the increase in the total number of invalid sign-on attempts since the last time interval exceeds a scan-level threshold number. The system detects a third DoS attack on multiple user profiles if the total number of invalid sign-on attempts detected during combined time intervals exceeds a third threshold number.

17 Claims, 3 Drawing Sheets

(56) References Cited

U.S. PATENT DOCUMENTS

| | | |
|---|---|---|
| 8,407,342 B2 | 3/2013 | Kurapati et al. |
| 8,543,734 B2 | 9/2013 | Mcdysan |
| 8,549,645 B2 | 10/2013 | Tang et al. |
| 8,549,646 B2 | 10/2013 | Stavrou et al. |
| 8,711,791 B2 | 4/2014 | Wang et al. |
| 8,793,780 B2 | 7/2014 | Suffling |
| 8,869,275 B2 | 10/2014 | Zhao et al. |
| 8,973,150 B2 | 3/2015 | Jackson et al. |
| 9,009,812 B2 | 4/2015 | Mcdysan |
| 9,055,006 B2 | 6/2015 | Chesla et al. |
| 9,148,440 B2 | 9/2015 | Be'Ery et al. |
| 9,197,666 B2 | 11/2015 | Carney et al. |
| 9,282,113 B2 | 3/2016 | Vaughan |
| 9,294,483 B2 | 3/2016 | Wong |
| 9,344,426 B2 | 5/2016 | Gupta et al. |
| 9,396,330 B2 | 7/2016 | Muthiah |
| 9,432,385 B2 | 8/2016 | Kustarz et al. |
| 9,438,702 B2 | 9/2016 | Kancherla |
| 9,449,170 B2 | 9/2016 | Walsh |
| 9,450,981 B2 | 9/2016 | Doron et al. |
| 9,628,509 B2 | 4/2017 | Holloway et al. |
| 9,654,502 B2 | 5/2017 | Thubert et al. |
| 9,661,019 B2 | 5/2017 | Liu |
| 9,838,421 B2 | 12/2017 | Htay et al. |
| 9,998,478 B2 | 6/2018 | Shahbazi |
| 10,021,132 B2 | 7/2018 | Adams et al. |
| 10,044,751 B2 | 8/2018 | Huston, III |
| 10,185,670 B2 | 1/2019 | Litichever et al. |
| 10,225,283 B2 * | 3/2019 | Mathew .............. H04L 63/1458 |
| 10,291,630 B2 * | 5/2019 | Saito .................. H04L 63/1416 |
| 10,581,903 B2 | 3/2020 | Donahue et al. |
| 10,887,342 B2 | 1/2021 | Thompson et al. |
| 2005/0216955 A1 * | 9/2005 | Wilkins .............. H04L 63/1408 726/23 |
| 2006/0143117 A1 * | 6/2006 | Chigira .................. G07C 9/37 705/44 |
| 2015/0058989 A1 | 2/2015 | Lahti et al. |
| 2015/0067845 A1 * | 3/2015 | Chari .................... G06F 21/50 726/23 |
| 2015/0200960 A1 | 7/2015 | Dickinson et al. |
| 2015/0229669 A1 | 8/2015 | Xin et al. |
| 2015/0312273 A1 | 10/2015 | Pappu et al. |
| 2017/0134362 A1 * | 5/2017 | Randall ................ H04L 63/083 |
| 2017/0310703 A1 | 10/2017 | Ackerman et al. |
| 2018/0234443 A1 * | 8/2018 | Wolkov ............... H04L 67/535 |
| 2020/0213334 A1 * | 7/2020 | Kutner ................. H04L 63/101 |
| 2020/0267178 A1 * | 8/2020 | Maor ................. H04L 63/1425 |

* cited by examiner

FIG. 1

| Row | DoS attack parameters 210 | Start/scan 1 (first time interval 152a) | Scan 2 (second time interval 152b) |
|---|---|---|---|
| 1 | Total number of user profiles 122 | 274 | 274 |
| 2 | Single-user profile threshold number 160 | 50 | 50 |
| 3 | Scan-level threshold number 156 | 41 | 41 |
| 4 | Threshold number 158 | 82 | 82 |
| 5 | Total invalid sign-on attempts 154 -from the last time interval 152 | 633 | 675 |
| 6 | Total invalid sign-on attempts 154 -at current time interval 152 | 674 | 790 |
| 7 | Single user profile invalid sign-on attempts -since the start of the first time interval 152a | 30 | 60 |
| 8 | Total invalid sign-on attempts 154 - change since the previous scan/time interval 152 | 41 | 115 |
| 9 | Total invalid sign-on attempts 154 - increase since the start of the first time interval 152a | 41 | 157 |
| 10 | Alert to indicate a DoS attack on a single user profile | False | True |
| 11 | Alert to indicate a DoS attack during the current time interval 152 | False | True |
| 12 | Alert to indicate a DoS attack during combined time intervals 152 | False | True |

Table 200

INFORMATION SECURITY SYSTEM AND METHOD FOR DENIAL-OF-SERVICE DETECTION

TECHNICAL FIELD

The present disclosure relates generally to information security, and more specifically to information security system and method for Denial-of-Service (DoS) detection.

BACKGROUND

As the Internet continues to be utilized by an ever-increasing number of users, so does unauthorized activity via the Internet. One way for malicious users to cause damage to a network is through DoS (Denial-of-Service) attacks. DoS attacks can overload the network bandwidth of a computer system, by repeatedly targeting the computer system with a larger amount of data, thereby occupying the computer system's data processing and memory resources. In some cases, a DoS attack may be an attempt to gain unauthorized access to information stored in the computer system, for example, by attempting to log into a user profile account using multiple computer-generated passwords. Current network security is not configured to provide a reliable and efficient solution to detect DoS attacks.

SUMMARY

The system described in the present disclosure is particularly integrated into a practical application of detecting Denial-of-Service (DoS) attacks on computer systems. Users may use computer systems to access their user profiles. User profiles may store private or confidential information associated with the users. A bad actor may launch a DoS attack on computer systems by, for example, launching a cyber attack or brute-force attack to attempt to log into the user profiles using multiple computer-generated passwords. If such a DoS attack is left undetected, the bad actor may gain unauthorized access to the user profiles, and data stored in the user profiles may be exfiltrated, destroyed, or modified. Current network security and information security technologies are not configured to detect DoS attacks. The disclosed system contemplates systems and methods to detect various types of DoS attacks, as described below.

The disclosed system is configured to detect invalid sign-on or login attempts on user profiles at every time interval. For example, the disclosed system collects invalid sign-on attempts on the user profiles every fifteen minutes, thirty minutes, one hour, etc. The disclosed system may determine that a sign-on attempt is invalid if a provided password does not match a predefined password that is stored in a memory of the disclosed system.

The disclosed system is configured to detect a DoS attack on a single user profile, as described below. The disclosed system determines the number of invalid sign-on attempts on each user profile since the start of the time interval. The disclosed system determines the maximum number of invalid sign-on attempts on a single user profile. For example, with respect to user profiles within an organization, assume that the disclosed system detected four invalid sign-on attempts on a first user profile, seven invalid sign-on attempts on a second user profile, thirty invalid sign-on attempts on a third user profile, and no invalid sign-on attempts on the rest of the user profiles within the organization. In this example, the disclosed system determines that the maximum number of invalid sign-on attempts on a single user profile is thirty. The disclosed system compares the maximum number of invalid sign-on attempts with a single-user profile threshold number that is predefined by an operator. If the disclosed system determines that the maximum number of invalid sign-on attempts exceeds the single-user threshold number, the disclosed system triggers an alert that indicates that a first DoS attack is detected on a particular user profile.

The disclosed system is configured to detect a DoS attack on multiple user profiles, as described below. From the total number of invalid sign-on attempts detected during each scan interval or time interval, the disclosed system determines the increase in the total number of invalid sign-on attempts in the current time interval since the last time interval. The disclosed system compares the increase in the total number of invalid sign-on attempts in the current time interval since the last time interval with a scan-level threshold number that is predefined by the operator.

The disclosed system determines whether the total number of invalid sign-on attempts in the current time interval since the last time interval exceeds the scan-level threshold number. If the disclosed system determines that the total number of invalid sign-on attempts in the current time interval since the last time interval exceeds the scan-level threshold number, the disclosed system triggers an alert that indicates a second DoS attack is detected on multiple user profiles during the current time interval, i.e., at a scan-level.

The disclosed system is configured to detect a DoS attack on multiple users during multiple time intervals, as described below. As described above, the disclosed system collects invalid sign-on attempts at every consecutive time interval, e.g., every fifteen minutes, thirty minutes, one hour, etc. The disclosed system may combine the number of invalid sign-on attempts detected at each time interval, for example, during a day. The disclosed system compares the combined number of invalid sign-on attempts with a third threshold number that is predefined by the operator. The disclosed system determines whether the combined number of invalid sign-on attempts exceeds the third threshold number. If the disclosed system determines that the combined number of invalid sign-on attempts exceeds the third threshold number, the disclosed system triggers an alert that indicates a third DoS attack on multiple user profiles since the start of the first time interval is detected.

In some embodiments, the disclosed system may further be configured to detect DoS attacks based on detecting a number of disabled user profile accounts. The disclosed system may disable a user profile account in response to detecting more than a threshold number of invalid sign-on attempts in a threshold period, such as ten invalid sign-on attempts in five minutes. Similar to that described above, the disclosed system may detect the number of disabled user profiles at every time interval.

The disclosed system may detect DoS attacks on multiple user profiles based on detecting that an increase in the number of disabled user profiles detected during the current time interval exceeds the scan-level threshold number, similar to that described above with respect to detecting invalid sign-on attempts.

The disclosed system may detect DoS attacks on multiple user profiles based on detecting that the combined number of disabled user accounts detected on multiple time intervals (e.g., during a day) exceeds the third threshold number, similar to that described above with respect to detecting invalid sign-on attempts.

In any of the cases described above, the disclosed system may trigger the alert by sending a text message to email addresses and/or phone numbers associated with authorized personnel.

In one embodiment, a system for DoS attack detection comprises a memory and a processor. The memory is operable to store a first threshold number associated with invalid sign-on attempts, where the first threshold number is determined with respect to a first time interval. The processor is operably coupled with the memory. The processor detects a first number of invalid sign-on attempts with respect to a plurality of user profiles during the first time interval, where the first time interval is from an initial timestamp to a first timestamp. The processor detects a second number of invalid sign-on attempts with respect to the plurality of user profiles during a second time interval, where the second time interval is from the first timestamp to a second timestamp. The processor determines a difference between the first number of invalid sign-on attempts and the second number of invalid sign-on attempts. The processor determines whether the difference between the first number of invalid sign-on attempts and the second number of invalid sign-on attempts is more than the first threshold number. In response to determining that the first number of invalid sign-on attempts is more than the first threshold number, the processor triggers a first alert that indicates detection of a first DoS attack on multiple user profiles during the second time interval.

The disclosed system provides several practical applications and technical advantages, which include: 1) technology that detects individual DoS attacks on every single user profile based on detecting invalid sign-on attempts, where each DoS attack is targeting a single user profile; 2) technology that detects a DoS attack on multiple user profiles (e.g., associated with an organization) during a particular time interval, where the DoS attack is targeting the multiple user profiles at a particular time interval; 3) technology that detects a DoS attack on multiple user profiles (e.g., associated with an organization) during multiple consecutive or non-consecutive time intervals, such that even if the DoS attack is launched at different non-consecutive time intervals particularly to throw off any suspicion that this is indeed a DoS attack, the technology detects such DoS attacks and triggers an alert; 4) technology that detect DoS attacks on multiple user profiles based on detecting an increase in a number of disabled user profiles during a particular time interval; and 5) technology that detects DoS attacks on multiple user profiles based on detecting a total number of disabled user profiles during a combination of consecutive or non-consecutive time intervals.

As such, the disclosed system may be integrated into a practical application of improving the current network security and information security technologies by detecting various DoS attacks on a single user profile, multiple user profiles during a particular time interval, and multiple user profiles during combined time intervals.

The disclosed system may further be integrated into an additional practical application of improving underlying operations of computer systems that are targeted by DoS attacks. If a DoS attack is left undetected, the network bandwidth associated with the computer systems may be flooded by a large number of data that occupies their processing and memory resources and leads to the computer system not being able to perform any operation, slow down, or even shut down. Thus, the disclosed system may improve the underlying operations of the computer systems.

The disclosed system may further be integrated into a practical application of preventing or minimizing unauthorized access to user profiles that are targeted by DoS attacks. This, in turn, provide an additional practical application of securing data stored in the user profiles, thus protecting the data from exfiltration, extraction, destruction, and modification.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect DoS attacks on one or more user profiles. This disclosure provides various systems and methods to detect DoS attacks on one or more user profiles. In one embodiment, system 100 to detect DoS attacks on one or more user profiles is described in FIG. 1. In one embodiment, Table 200 illustrating an example scenario of system 100 to detect DoS attacks on one or more user profiles is described in FIG. 2. In one embodiment, method 300 for detecting DoS attacks on one or more user profiles is described in FIG. 3.

Example System for Denial-of-Service (DoS) Attack Detection

Figure 1:
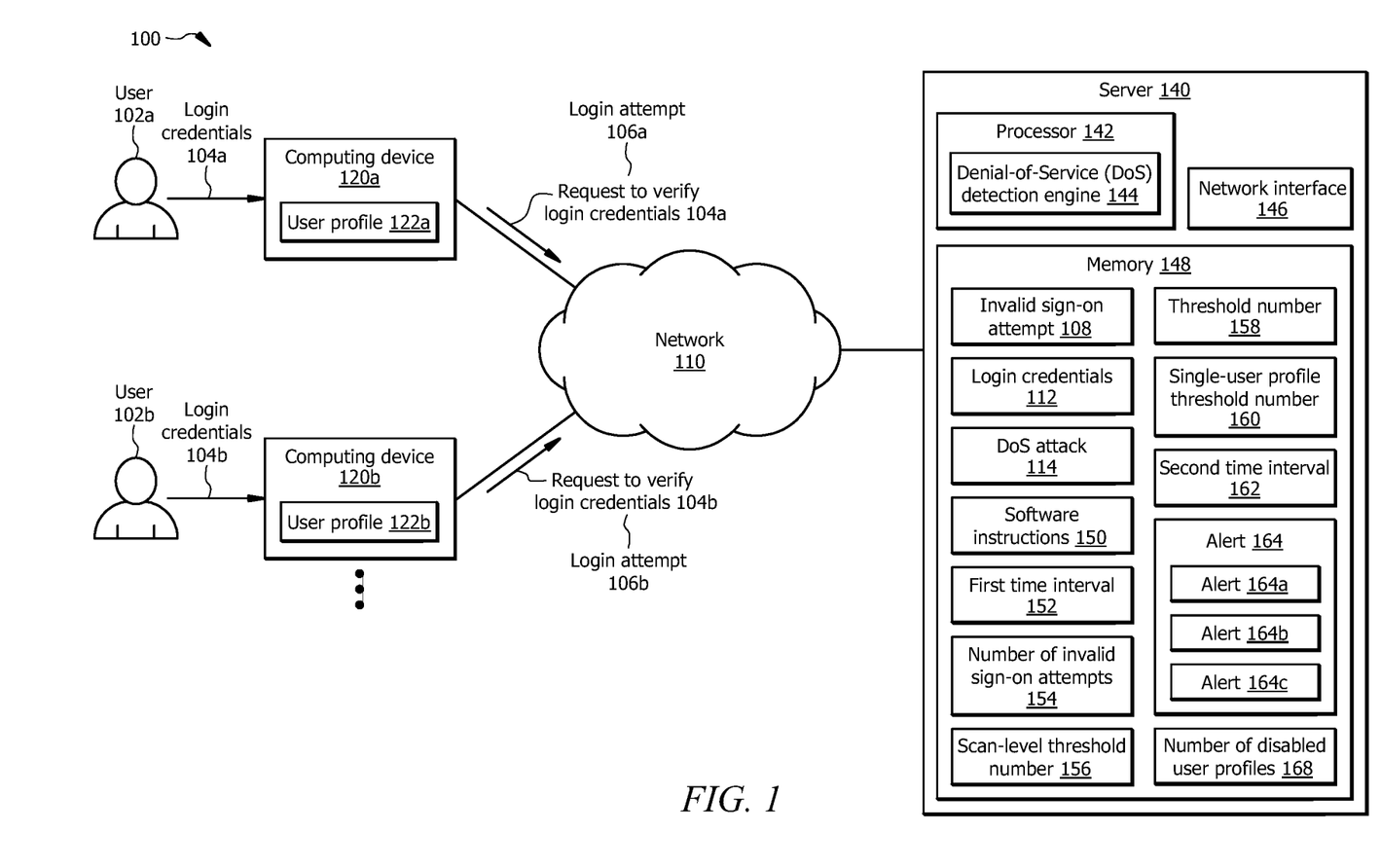
FIG. 1 illustrates an embodiment of a system configured to detect DoS attacks on one or more user profiles.

FIG. 1 illustrates one embodiment of a system 100 that is configured to detect DoS attacks 114 on one or more user profiles 122. In one embodiment, system 100 comprises a server 140. In some embodiments, system 100 further comprises a network 110 and one or more computing devices 120, such as computing devices 120a and 120b. Network 110 enables communications between components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes a DoS detection engine 144 to detect DoS attacks 114 on one or more user profiles 122. In other embodiments, system 100 may not have all of the components listed and/or may have other elements instead of, or in addition to, those listed above.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each of the computing devices 120a and 120b is an instance of a computing device 120. Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The system 100 may include any number of computing devices 120. For example, system 100 may include multiple computing devices 120 that are associated with an organization, where the server 140 is also associated with the same organization and is configured to oversee incoming and outgoing communications of the computing devices 120.

A user 102 can log in to their user profile 122 using a computing device 120. In the example of FIG. 1, the user 102a may attempt to log in to their user profile 122a using the computing device 120a. To this end, the user 102a inputs their login credentials 104a into a portal, a webpage, or an interface displayed on a screen of the computing device 120a. upon receiving the login credentials 104a, the computing device 120a sends a request to the server 140 to verify the login credentials 104a. This event is captured as a login attempt 106a by the server 140 (via the processor 142). Likewise, the user 102b may attempt to log in to their user profile 122b using the computing device 120b. This event is captured as a login attempt 106b by the server 140 (via the processor 142).

To verify a login credential 104, the processor 142 compares the provides login credentials 104 (e.g., password) with information previously set by the user 102 and stored in a database, such as a login credential 112 associated with the user 102 that is stored in the memory 148. If the processor 142 detects that the provided login credential 104 does not match the login credential 112, the processor 142 determines that this is an invalid sign-on attempt 108. In some cases, a bad actor (whether external or internal with respect to the organization) may attempt to access one or more user profiles 122 by attempting multiple passwords to access each of the one or more user profiles 122. For example, a bad actor may launch a cyberattack, brute force attack, etc. to gain unauthorized access to one or more user profiles 122. In some cases, a user 102 may intentionally or inadvertently attempt to access one or more user profiles 122 by attempting multiple passwords to access each of the one or more user profiles 122. In some cases, a bad actor and/or a user 102 may launch a DoS attack by attempting multiple passwords on one or more user profiles 122 in an attempt to shut down or slow down one or more computing devices 120, network 110, and server 140, occupy network bandwidth, etc. Current technology does not provide a solution to detect such DoS attacks 114. System 100 provides a technical solution and practical application of detecting DoS attacks 114 on one or more user profiles 122.

Server

Server 140 is generally a device that is configured to process data and communicate with computing devices (e.g., computing devices 120), databases, etc., via the network 110. The server 140 is generally configured to oversee the operations of the DoS detection engine 144, as described further below in conjunction with the operational flow of system 100 and method 300 described in FIG. 3.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the DoS detection engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of method 300 as described in FIG. 3.

Network interface 146 is configured to enable wired and/or wireless communications (e.g., via network 110). The network interface 146 is configured to communicate data between the server 140 and other devices (e.g., computing devices 120), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the invalid sign-on attempts 108, login credentials 112, software instructions 150, first time interval 152, number of invalid sign-on attempts 154, scan-level threshold number 156, threshold number 158, single-user profile threshold number 160, second time interval 162, alerts 164, number of disabled user profiles 168, DoS attacks 114, and/or any other data or instructions. The software instructions 150 may comprise any suitable set of instructions, logic, rules, or code operable to execute the processor 142.

DoS Detection Engine

DoS detection engine 144 may be implemented by the processor 142 executing the software instructions 150, and is generally configured to detect DoS attacks 114 on one or more user profiles 122.

In one embodiment, the DoS detection engine 144 may be triggered to scan login attempts 106 at every time interval 152. The time interval 152 maybe fifteen minutes, thirty minutes, one hour, or any other suitable time interval.

The DoS detection engine 144 is configured to detect whether each login attempt 106 failed or succeeded. For example, with respect to login attempt 106a initiated by the user 102a, the DoS detection engine 144 determines whether the login attempt 106a failed or succeeded by comparing the password associated with the login credentials 104a with the password associated with the login credentials 112. If the DoS detection engine 144 determines that the password associated with the login credentials 104a matches the password associated with the login credentials 112, the DoS detection engine 144 determines that the login attempt 106a succeeded. Otherwise, the DoS detection engine 144 determines that login attempt 106a is an invalid sign-on attempt 108. The DoS detection engine 144 may perform a similar operation for every login attempt 106 during the time interval 152.

The DoS detection engine 144 is configured to accept a scan-level threshold number 156, a threshold number 158, and a single-user profile threshold number 160. The DoS detection engine 144 uses this information to detect whether the total number of invalid sign-on attempts 154 detected during different time intervals exceeds a particular threshold number. This process is described in detail below.

Operational Flow

Operational flow of the system 100 begins where the DoS detection engine 144 collects invalid sign-on attempts 154 detected during a predefined scan interval or time interval 152. The collected invalid sign-on attempts 154 may be associated with multiple users 102. In this process, the DoS detection engine 144 detects whether each sign-on attempt 106 detected during the time interval 152 failed or succeeded, similar to that described above. If a login attempt 106 fails, the DoS detection engine 144 increments the total number of invalid sign-on attempts 154 by one.

Figure 2:
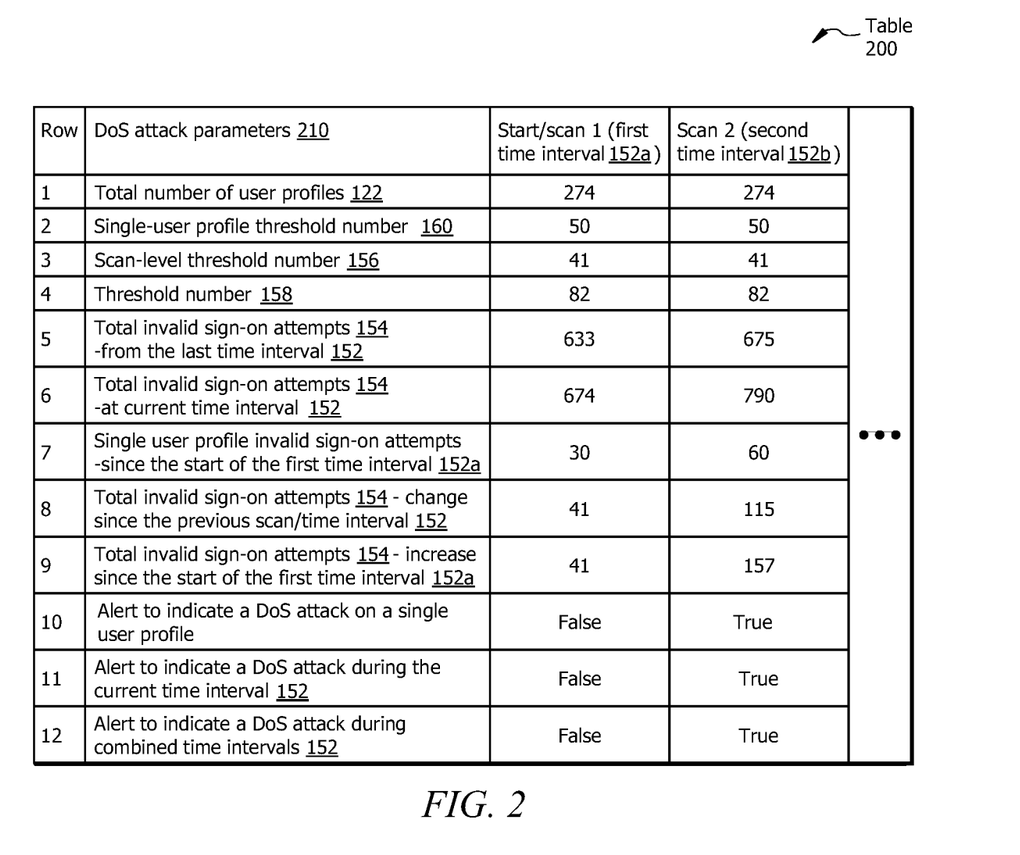
FIG. 2 illustrates an example table that shows an example scenario operation of the system of FIG. 1 to detect DoS attacks on one or more user profiles.

Referring to FIG. 2, an example scenario where the DoS detection engine 144 detects DoS attacks 114 on one or more user profiles 122 is shown. In Table 200, the DoS attack parameters 210 are shown. In the example of FIG. 2, assume that the total number of user profiles 122 is 274, the single-user profile threshold number 160 is 50, scan-level threshold number 156 is 41 (which is 15% of 274, the total number of user profiles 122), and the second threshold number 158 is 82 (which is 30% of 274, the total number of user profiles 122). Also, assume that the DoS detection engine 144 has detected 633 invalid sign-on attempts 154 in the last scan or the last time interval 152, e.g., since yesterday. Also, assume that the DoS detection engine 144 has detected 674 invalid sign-on attempts 154 in the current scan or the first time interval 152a. For example, an operator may set the scan-level threshold number 156, threshold number 158, and single-user profile threshold number 160.

Referring back to FIG. 1, the scan-level threshold number 156 may be associated with the time interval 152. The scan-level threshold number 156 may be determined based on a particular percentage of the total number of user profiles 122. For example, the scan-level threshold number 156 may be determined to be 15% of the total number of user profiles 122. In other examples, the scan-level threshold number 156 may be any suitable percentage of the total number of user profiles 122.

The scan-level threshold number 156 may be referred to as a first threshold number 156. The single-user profile threshold number 160 may be associated with the time interval 162 (e.g., a day). For example, the single-user profile threshold number 160 may be fifty per day as shown in Table 200. In other examples, the single-user profile threshold number 160 may be any suitable number associated with the time interval 162.

The threshold number 158 may be determined based on a particular percentage of the total number of user profiles 122, e.g., 30%, 35%, etc. of the total number of user profiles 122. The second threshold number 158 may be associated with the second time interval 162 (e.g., a day).

Detecting a DoS Attack on a Single User Profile Based on Detecting Invalid Sign-On Attempts The DoS detection engine 144 determines the number of invalid sign-on attempts 154 on each user profile 122. For each user profile 122, the DoS detection engine 144 determines whether the number of invalid sign-on attempts 154 exceeds the single-user profile threshold number 160. The DoS detection engine 144 compares the maximum number of invalid sign-on attempts 154 detected on a single user profile 122 with the single-user profile threshold number 160. The DoS detection engine 144 determines whether the maximum number of invalid sign-on attempts 154 on a single user profile 122 detected since the start of the first time interval 152a exceeds the single-user profile threshold number 160. If the DoS detection engine 144 determines that the maximum number of invalid sign-on attempts 154 on a single user profile 122 detected since the start of the first time interval 152a exceeds the single-user profile threshold number 160, the DoS detection engine 144 triggers an alert 164a. The alert 164a may indicate that a DoS attack 114 on a single user profile 122 is detected.

Referring to FIG. 2, the first time interval 152a may be from an initial timestamp to a first timestamp, e.g., from 8 am to 8:15 am, and the second time interval 152b may be from the first timestamp to a second timestamp, e.g., 8:15 am to 8:30 am.

With respect to the first time interval 152a, assume that the DoS detection engine 144 has detected four invalid sign-on attempts 106 on the user profile 122a, thirty invalid sign-on attempts 154 on the user profile 122b, and one invalid sign-on attempt 106 on the rest of the user profiles 122. In this example, the DoS detection engine 144 determines that the maximum number of invalid sign-on attempts 106 on a single user profile 122 is thirty, as shown in row 7 of Table 200. In the example of FIG. 2, with respect to the first time interval 152a, the DoS detection engine 144 determines that the maximum number of invalid sign-on attempts 154 on a single user profile 122 since the start of the first time interval 152a (e.g., 30) does not exceed the single-user profile threshold number 160 (e.g., 50). Thus, in this particular example, the DoS detection engine 144 does not trigger the alert 164a, as noted by "False" in row 10 with respect to the first time interval 152a.

With respect to the second time interval 152b, assume that the DoS detection engine 144 has detected that the maximum number of invalid sign-on attempts 154 on a single user profile 122 since the start of the first time interval 152a is sixty. Thus, the DoS detection engine 144 determines that the maximum number of invalid sign-on attempts 154 on a single user profile 122 since the start of the first time interval 152a (i.e., 60) exceeds the single-user profile threshold number 160 (i.e., 50). Thus, in this particular example, the DoS detection engine 144 triggers the alert 164, as noted by "True" in row 10 with respect to the second time interval 152b.

Detecting DoS Attacks on Multiple User Profiles Based on Detecting Invalid Sign-On Attempts Referring back to FIG. 1, the DoS detection engine 144 determines the difference between the total number of invalid sign-on attempts 154 on the user profiles 122 during the current time interval 152 and the previous time interval 152 (or previous scan). In other words, the DoS detection engine 144 determines how many invalid sign-on attempts 154 are added to (or removed from) the total number of invalid sign-on attempts 154 during each time interval 152 since the last time interval 152. For each time interval 152, the DoS detection engine 144 compares the change in the total number of invalid sign-on attempts 154 in that time interval 152 (with respect to its previous time interval 152) with the scan-level threshold number 156. If the DoS detection engine 144 determines that the increase in the total number of invalid sign-on attempts 154 in the current time interval 152 exceeds the scan-level threshold number 156, the DoS detection engine 144 triggers an alert 164b. The alert 164b may indicate that the increase in the total number of invalid sign-on attempts 154 in the current time interval 152 exceeds the scan-level threshold number 156. The alert 164b may also indicate that a DoS attack 114 on multiple user profiles 122 is detected. The DoS detection engine 144 may send a message that contains the alert 164b to email addresses associated with users 102 associated with user profiles 122 on which the invalid sign-on attempts 154 are detected.

Referring to FIG. 2, with respect to the first time interval 152a, the DoS detection engine 144 determines that the change in the total number of invalid sign-on attempts 154 since the previous scan or time interval 152 is 41 (i.e., 674–633), as shown in row 8 of Table 200. In this particular example, the DoS detection engine 144 determines that the change in the total number of invalid sign-on attempts 154 in the time interval 152a since the previous time interval 152 (i.e., 41) does not exceed the scan-level threshold number 156 (i.e., 41). Thus, in this particular example, the DoS detection engine 144 does not trigger the alert 164b, as noted by "False" in row 11 with respect to the first time interval 152a.

With respect to the second time interval 152a, the DoS detection engine 144 determines that the change in the total number of invalid sign-on attempts 154 in the time interval 152b since the previous time interval 152a (i.e., 115) exceeds the scan-level threshold number 156 (i.e., 41). Thus, the DoS detection engine 144 triggers the alert 164b, as noted by "True" in row 11 with respect to the second time interval 152b.

Detecting DoS Attacks on Multiple User Profiles During a Time Interval Based on Detecting Invalid Sign-On Attempts Referring back to FIG. 1, the DoS detection engine 144 determines the increase (and/or change) in the total number of invalid sign-on attempts 154 on the user profiles 122 since the start of the first time interval 152a. For example, the DoS detection engine 144 may combine the number of invalid sign-on attempts 154 on the user profiles 122 in two or more time intervals 152. The DoS detection engine 144 compares the combined number of invalid sign-on attempts 154 since the start of the first time interval 152a with the second threshold number 158. The DoS detection engine 144 determines whether the combined number of invalid sign-on attempts 154 since the start of the first time interval 152a in two or more consecutive (or non-consecutive) time intervals 152 exceeds the second threshold number 158. If the DoS detection engine 144 determines that the combined number of invalid sign-on attempts 154 since the start of the first time interval 152a in two or more consecutive (or non-consecutive) time intervals 152 exceeds the second threshold number 158, the DoS detection engine 144 triggers an alert 164c. The alert 164c may indicate that a DoS attack 114 on multiple user profiles 122 during the combined intervals 152 is detected.

Referring to FIG. 2, with respect to the first time interval 152a, the DoS detection engine 144 determines that the combined number of invalid sign-on attempts 154 since the start of the first time interval 152a is 42. The DoS detection engine 144 determines that the combined total number of invalid sign-on attempts 154 since the start of the first time interval 152a (i.e., 41) does not exceed the second threshold number 158 (i.e., 82). Thus, in this particular example, with respect to the first time interval 152a, the DoS detection engine 144 does not trigger the alert 164c, as noted by "False" in row 12 with respect to the first time interval 152a.

With respect to the second time interval 152b, the DoS detection engine 144 determines that the combined total number of invalid sign-on attempts 154 during the first and second time intervals 152a and 152b (i.e., 157) exceeds the second threshold number 158. Thus, the DoS detection engine 144 triggers the alert 164c, as noted by "True" in row 12 with respect to the second time interval 152b.

Referring back to FIG. 1, in some embodiments, the DoS detection engine 144 is further configured to detect disabled user profiles 122 as a result of a DoS attack 114. This process is described below. The DoS detection engine 144 may disable a user profile 122 if more than a threshold number of failed login attempts 106 within a threshold time duration (e.g., more than 10 failed login attempts 106 in 5 minutes) is detected on the user profile 122.

Detecting DoS Attacks on Multiple User Profiles Based on Detecting Disabled User Profiles The DoS detection engine 144 collects the number of disabled user profiles 168 during each time interval 152. The DoS detection engine 144 determines the difference between the total number of disabled user profiles 168 detected in the current time interval 152 and the previous time interval 152. If the DoS detection engine 144 determines that the difference between the total number of disabled user profiles 168 detected in the current time interval 152 and the previous time interval 152 exceeds the scan-level threshold number 156, the DoS detection engine 144 triggers the alert 164b.

In some embodiments, the scan-level threshold number 156 for detecting invalid sign-on attempts 154 and disabled user profiles 168 may be different from each other. For example, the scan-level threshold number 156 for detecting invalid sign-on attempts 154 maybe 15% of the total number of user profiles 122, and the scan-level threshold number 156 for detecting disabled user profiles 122 maybe 5%, or any other suitable percentage of the total number of user profiles 122.

Detecting DoS Attacks on Multiple User Profiles During a Time Interval Based on Detecting Disabled User Profiles The DoS detection engine 144 determines the increase (and/or change) in the total number of disabled user profiles 168 since the start of the first time interval 152a. For example, the DoS detection engine 144 may combine the number of disabled user profiles 122 in two or more consecutive (or non-consecutive) time intervals 152. The DoS detection engine 144 compares the combined number of disabled user profiles 168 since the start of the first time interval 152 with the second threshold number 158. The DoS detection engine 144 determines whether the combined number of disabled user profiles 122 since the start of the first time interval 152a in two or more consecutive (or non-consecutive) time intervals 152 exceeds the second threshold number 158. If the DoS detection engine 144 determines that the combined number of disabled user profiles 168 since the start of the first time interval 152a in two or more consecutive (or non-consecutive) time intervals 152 exceeds the second threshold number 158, the DoS detection engine 144 triggers the alert 164c.

In some embodiments, the second threshold number 158 for detecting invalid sign-on attempts 154 and disabled user profiles 168 may be different from each other. For example, the second threshold number 158 for detecting invalid sign-on attempts 154 maybe 30% of the total number of user profiles 122, and the second threshold number 158 for detecting disabled user profiles 122 maybe 10% or any other suitable percentage of the total number of user profiles 122.

In some embodiments, the DoS detection engine 144 may be configured to exclude outliers from the total number of invalid sign-on attempts 154 and/or disabled user profiles 168. For example, the DoS detection engine 144 may be configured to detect that an invalid sign-on attempt 108 is associated with a user 102 (e.g., a developer) who is in the process of testing a login web application interface and needs to test failed login cases. Thus, the DoS detection engine 144 may remove the detected invalid sign-on attempt 108 from the total number of invalid sign-on attempts 154.

In another example, the DoS detection engine 144 may be configured to detect that an invalid sign-on attempt 108 has been validated, e.g., by answering security questions, verifying a passcode sent to a phone number of the user 102, etc. Thus, the DoS detection engine 144 may exclude the invalid sign-on attempt 108 from the total number of invalid sign-on attempts 154.

In another example, the DoS detection engine 144 may be configured to detect that a disabled user profile 122 has been validated, e.g., by answering security questions, verifying a passcode sent to a phone number of the 102, etc. Thus, the DoS detection engine 144 may exclude the disabled user profile 122 from the total number of disabled user profiles 168.

In some embodiments, the DoS detection engine 144 may account for new user profiles 122 that are created during a time interval 152, and add them to the total number of user profiles 122 accordingly.

In some embodiments, the DoS detection engine 144 may account for user profiles 122 that are deleted during one or more time intervals 152, and remove them from the total number of user profiles 122 accordingly.

In some embodiments, the DoS detection engine 144 may trigger any of the alerts 164a-c by displaying a message that comprises a text describing the alert 164 on a screen on the server 140 and/or computing devices 120, sending one or more messages that indicates the alert 164 to one or more authorized personnel, e.g., developers, information security personnel, etc. via an email message, text message, etc.

In some embodiments, the DoS detection engine 144 may detect whether the identity of a user 102 associated with an invalid sign-on attempt 108 that is detected during a time interval 152, e.g., time interval 152a, is verified during the first time interval 152a. If the DoS detection engine 144 determines that the identity of the user 102 associated with the invalid sign-on attempt 108 is verified, the DoS detection engine 144 deducts the first number of invalid sign-on attempts 154 (detected during the first time interval 152a) by one. If the DoS detection engine 144 determines that the identity of the user 102 associated with the invalid sign-on attempt 108 is verified during a different time interval 152, e.g., second time interval 152b, the DoS detection engine 144 deducts the second number of invalid sign-on attempts 154 (detected during the second time interval 152b) by one.

Example Table for Detecting DoS Attacks on One or More User Profiles

FIG. 2 illustrates the Table 200 that includes an example scenario where the DoS detection engine 144 detects DoS attacks on one or more user profiles 122. The Table 200 may include any number of time intervals 152. During any of the time intervals 152 any of and any combination of the alerts 164a-c may be triggered based on the determined changes in the number of invalid sign-on attempts 154. Similarly, during any of the time intervals 152 any of and any combination of the alerts 164a and 164b may be triggered based on the determined changes in the number of disabled user profiles 122.

Example Method for DoS Attack Detection

Figure 3:
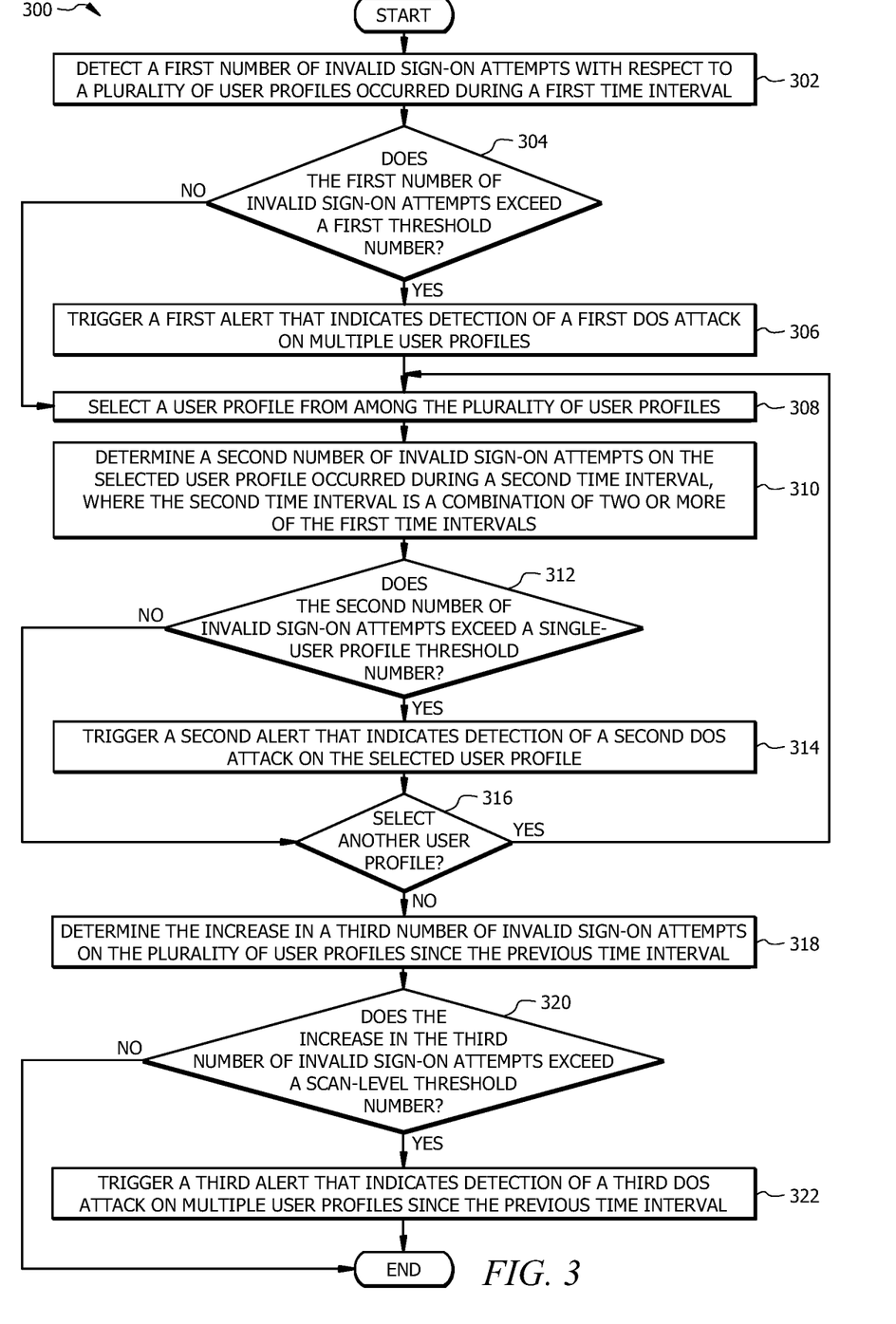
FIG. 3 illustrates an example flowchart of a method to detect DoS attacks on one or more user profiles.

FIG. 3 illustrates an example flowchart of a method 300 for detecting DoS attack 114 on one or more user profiles 122. Modifications, additions, or omissions may be made to method 300. Method 300 may include more, fewer, or other steps. For example, steps may be performed in parallel or in any suitable order. While at times discussed as the system 100, processor 142, DoS detection engine 144, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-322.

Method 300 begins at step 302 where the DoS detection engine 144 detects a first number of invalid sign-on attempts 154 with respect to a plurality of user profiles 122 occurred since the start of the first time interval 152a. For example, the DoS detection engine 144 may collect the number of invalid sign-on attempts 154 that occurred on the user profiles 122 since the start of the first time interval 152a, similar to that described in FIGS. 1 and 2.

At step 304, the DoS detection engine 144 determines whether the first number of invalid sign-on attempts 154 exceeds the first threshold number 158. If the DoS detection engine 144 determines that the first number of invalid sign-on attempts 154 exceeds the first threshold number 158, method 300 proceeds to step 306. Otherwise, method 300 proceeds to step 308.

At step 306, the DoS detection engine 144 triggers the alert 164c that indicates detection of a first DoS attack 114 on multiple user profiles 122 during a particular time interval 152, e.g., the first time interval 152a, similar to that described above in FIGS. 1 and 2.

At step 308, the DoS detection engine 144 selects a user profile 122 from among the plurality of user profiles 122. The DoS detection engine 144 iteratively selects a user profile 122 until no user profile 122 is left for evaluation.

At step 310, the DoS detection engine 144 detects a second number of invalid sign-on attempts 154 with respect to the selected user profile 122 occurred during a second time interval 162, where the second time interval 162 is a combination of two or more of the first time intervals 152. For example, the first time interval 152 may be fifteen minutes, and the second time interval 162 may be twenty-four hours. In this process, the DoS detection engine 144 detects the number of invalid sign-on attempts 154 on the selected user profile 122 in each time interval 152, and combines them.

At step 312, the DoS detection engine 144 determines whether the second number of invalid sign-on attempts 154 exceeds the single-user profile threshold number 160. If the DoS detection engine 144 determines that the second number of invalid sign-on attempts 154 exceeds the single-user profile threshold number 160, method 300 proceeds to step 314. Otherwise, method 300 proceeds to step 316.

At step 314, the DoS detection engine 144 triggers an alert 164*a* that indicates detection of a second DoS attack 114 on the selected user profile 122, similar to that described in FIGS. 1 and 2.

At step 316, the DoS detection engine 144 determines whether to select another user profile 122. The DoS detection engine 144 determines to select another user profile 122 if at least one user profile 122 is left for evaluation. If the DoS detection engine 144 determines to select another user profile 122, method 300 returns to step 308. Otherwise, method 300 proceeds to step 318.

At step 318, the DoS detection engine 144 detects an increase (and/or change) in the third number of invalid sign-on attempts 154 with respect to the plurality of user profiles 122 that occurred during the first time interval 152*a* since the previous time interval 152, similar to that described in FIGS. 1 and 2.

At step 320, the DoS detection engine 144 determines whether the increase (and/or change) in the third number of invalid sign-on attempts 154 with respect to the plurality of user profiles 122 during the first time interval 152 since the previous time interval 152 exceeds the scan-level threshold number 156. If the DoS detection engine 144 determines that the increase (and/or change) in the third number of invalid sign-on attempts 154 with respect to the plurality of user profiles 122 during the first time interval 152 since the previous time interval 152 exceeds the scan-level threshold number 156, method 300 proceeds to step 322. Otherwise, method 300 terminates.

At step 322, the DoS detection engine 144 triggers an alert 164*b* that indicates detection of a third DoS attack 114 on multiple user profiles 122 since the previous time interval 152, e.g., during multiple time intervals 152, similar to that described in FIGS. 1 and 2.

The DoS detection engine 144 may perform one or more steps of method 300 in every time interval 152 and/or time interval 162.

In some embodiments, method 300 may include one or more additional steps to detect the number of disabled user profiles 122, and trigger one or more alerts 164 based on the detected number of disabled user profiles 122, similar to that described in FIGS. 1 and 2.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for Denial-of-Service (DoS) attack detection comprising:
   a memory operable to store:
      a first threshold number associated with invalid sign-on attempts, wherein the first threshold number is determined with respect to a first time interval; and
      a second threshold number associated with the invalid sign-on attempts, wherein:
         the second threshold number is associated with a second time interval; and
         the second time interval has a more duration than the first time interval; and
   a processor, operably coupled with the memory, and configured to:
      detect a first number of invalid sign-on attempts with respect to a plurality of user profiles during the first time interval, wherein the first time interval is from an initial timestamp to a first timestamp;
      detect a second number of invalid sign-on attempts with respect to the plurality of user profiles during the second time interval, wherein the second time interval is from the first timestamp to a second timestamp;
      determine a difference between the first number of invalid sign-on attempts and the second number of invalid sign-on attempts;
      determine whether the difference between the first number of invalid sign-on attempts and the second number of invalid sign-on attempts is more than the first threshold number;
      in response to determining that the first number of invalid sign-on attempts is more than the first threshold number, trigger a first alert that indicates detection of a first DoS attack on multiple user profiles during the second time interval;
      combine the first number of invalid sign-on attempts and the second number of invalid sign-on attempts;
      determine whether the combination of the first number of invalid sign-on attempts and the second number of invalid sign-on attempts is more than the second threshold number; and
      in response to determining that the combination of the first number of invalid sign-on attempts and the second number of invalid sign-on attempts is more than the second threshold number, trigger a second alert that indicates detection of a second DoS attack on multiple user profiles during the first time interval and the second time interval.

2. The system of claim 1, wherein:
the memory is further operable to store a single-user profile threshold number associated with invalid sign-on attempts, and
the processor is further configured to:
detect a third number of invalid sign-on attempts made on a first user profile from among the plurality of user profiles; and
in response to determining that the third number of invalid sign-on attempts is more than the single-user profile threshold number, trigger a third alert that indicates detection of a third DoS attack on the first user profile.

3. The system of claim 1, wherein:
the memory is further operable to store a third threshold number associated with disabled user profiles, wherein the third threshold number is associated with the first time interval; and
the processor is further configured to:
detect a fourth number of disabled user profiles with respect to the plurality of user profiles occurred during the first time interval;
detect a fifth number of disabled user profiles with respect to the plurality of user profiles during the second time interval;
calculate the difference between the fifth number of disabled user profiles and the fourth number of disabled user profiles;
determine whether the difference between the fifth number of disabled user profiles and the fourth number of disabled user profiles is more than the third threshold number; and
in response to determining that the difference between the fifth number of disabled user profiles and the fourth number of disabled user profiles is more than the third threshold number, trigger a fourth alert that indicated detection of a fourth DoS attack on multiple user profiles during the second time interval.

4. The system of claim 3, wherein the processor is further configured to disable a user profile from among the plurality of user profiles in response to determining that a number of invalid sign-on attempts on the user profile within a threshold time period exceeds a threshold number of invalid sign-on attempts.

5. The system of claim 4, wherein:
the memory is further configured to store a fourth threshold number associated with disabled user profiles, wherein the fourth threshold number is associated with the second time interval; and
the processor is further configured to:
combine the fourth number of disabled user profiles and the fifth number of disabled user profiles;
determine whether the combination of the fourth number of disabled user profiles and the fifth number of disabled user profiles is more than the fourth threshold number; and
in response to determining that the combination of the fourth number of disabled user profiles and the fifth number of disabled user profiles is more than the fourth threshold number, trigger a fifth alert that indicates detection of a fifth DoS attack on multiple user profiles during the first time interval and the second time interval.

6. The system of claim 1, wherein the processor is further configured to:
detect whether an identity of a user associated with an invalid sign-on attempt that is detected during the first time interval is verified during the first time interval; and
in response to determining that the identity of the user associated with the invalid sign-on attempt is verified, deduct the first number of invalid sign-on attempts by one.

7. A method for Denial-of-Service (DoS) attack detection comprising:
detecting a first number of invalid sign-on attempts with respect to a plurality of user profiles during a first time interval, wherein the first time interval is from an initial timestamp to a first timestamp;
detecting a second number of invalid sign-on attempts with respect to the plurality of user profiles during a second time interval, wherein the second time interval is from the first timestamp to a second timestamp;
determining a difference between the first number of invalid sign-on attempts and the second number of invalid sign-on attempts;
determining whether the difference between the first number of invalid sign-on attempts and the second number of invalid sign-on attempts is more than a first threshold number, wherein:
the first threshold number is associated with invalid sign-on attempts, and
the first threshold number is determined with respect to the first time interval;
in response to determining that the first number of invalid sign-on attempts is more than the first threshold number, triggering a first alert that indicates detection of a first DoS attack on multiple user profiles during the second time interval;
combining the first number of invalid sign-on attempts and the second number of invalid sign-on attempts;
determining whether the combination of the first number of invalid sign-on attempts and the second number of invalid sign-on attempts is more than a second threshold number, wherein:
the second threshold number is associated with the second time interval, and
the second time interval has a more duration than the first time interval; and
in response to determining that the combination of the first number of invalid sign-on attempts and the second number of invalid sign-on attempts is more than the second threshold number, triggering a second alert that indicates detection of a second DoS attack on multiple user profiles during the first time interval and the second time interval.

8. The method of claim 7, further comprising:
detecting a third number of invalid sign-on attempts made on a first user profile from among the plurality of user profiles; and
in response to determining that the third number of invalid sign-on attempts is more than a single-user profile threshold number, triggering a third alert that indicates detection of a third DoS attack on the first user profile, wherein the single-user profile threshold number is associated with invalid sign-on attempts on a single user profile.

9. The method of claim 7, further comprising:
  detecting a fourth number of disabled user profiles with respect to the plurality of user profiles that occurred during the first time interval;
  detecting a fifth number of disabled user profiles with respect to the plurality of user profiles during the second time interval;
  calculating the difference between the fifth number of disabled user profiles and the fourth number of disabled user profiles;
  determining whether the difference between the fifth number of disabled user profiles and the fourth number of disabled user profiles is more than a third threshold number, wherein the third threshold number is associated with the first time interval; and
  in response to determining that the difference between the fifth number of disabled user profiles and the fourth number of disabled user profiles is more than the third threshold number, triggering a fourth alert that indicated detection of a fourth DoS attack on multiple user profiles during the second time interval.

10. The method of claim 9, further comprising disabling a user profile from among the plurality of user profiles in response to determining that a number of invalid sign-on attempts on the user profile within a threshold time period exceeds a threshold number of invalid sign-on attempts.

11. The method of claim 10, further comprising:
  combining the fourth number of disabled user profiles and the fifth number of disabled user profiles;
  determining whether the combination of the fourth number of disabled user profiles and the fifth number of disabled user profiles is more than a fourth threshold number, wherein the fourth threshold number is associated with the second time interval; and
  in response to determining that the combination of the fourth number of disabled user profiles and the fifth number of disabled user profiles is more than the fourth threshold number, triggering a fifth alert that indicates detection of a fifth DoS attack on multiple user profiles during the first time interval and the second time interval.

12. The method of claim 7, further comprising:
  detecting whether an identity of a user associated with an invalid sign-on attempt that is detected during the first time interval is verified during the first time interval; and
  in response to determining that the identity of the user associated with the invalid sign-on attempt is verified, deducting the first number of invalid sign-on attempts by one.

13. A non-transitory computer-readable medium storing instructions that when executed by a processor cause the processor to:
  detect a first number of invalid sign-on attempts with respect to a plurality of user profiles during a first time interval, wherein the first time interval is from an initial timestamp to a first timestamp;
  detect a second number of invalid sign-on attempts with respect to the plurality of user profiles during a second time interval, wherein the second time interval is from the first timestamp to a second timestamp;
  determine a difference between the first number of invalid sign-on attempts and the second number of invalid sign-on attempts;
  determine whether the first number of invalid sign-on attempts is more than a first threshold number, wherein:
    the first threshold number is associated with invalid sign-on attempts, and
    the first threshold number is determined with respect to the first time interval;
  in response to determining that the difference between the first number of invalid sign-on attempts and the second number of invalid sign-on attempts is more than the first threshold number, trigger a first alert that indicates detection of a first DoS attack on multiple user profiles during the second time interval;
  combine the first number of invalid sign-on attempts and the second number of invalid sign-on attempts;
  determine whether the combination of the first number of invalid sign-on attempts and the second number of invalid sign-on attempts is more than a second threshold number, wherein:
    the second threshold number is associated with the second time interval, and
    the second time interval has a more duration than the first time interval; and
  in response to determining that the combination of the first number of invalid sign-on attempts and the second number of invalid sign-on attempts is more than the second threshold number, trigger a second alert that indicates detection of a second DoS attack on multiple user profiles during the first time interval and the second time interval.

14. The non-transitory computer-readable medium of claim 13, wherein the instructions further cause the processor to:
  detect a third number of invalid sign-on attempts made on a first user profile from among the plurality of user profiles; and
  in response to determining that the third number of invalid sign-on attempts is more than a single-user profile threshold number, trigger a third alert that indicates detection of a third DoS attack on the first user profile, wherein the single-user profile threshold number is associated with invalid sign-on attempts on a single user profile.

15. The non-transitory computer-readable medium of claim 13, wherein the instructions further cause the processor to:
  detect a fourth number of disabled user profiles with respect to the plurality of user profiles that occurred during the first time interval;
  detect a fifth number of disabled user profiles with respect to the plurality of user profiles during the second time interval;
  calculate the difference between the fifth number of disabled user profiles and the fourth number of disabled user profiles;
  determine whether the difference between the fifth number of disabled user profiles and the fourth number of disabled user profiles is more than a third threshold number, wherein the third threshold number is associated with the first time interval; and
  in response to determining that the difference between the fifth number of disabled user profiles and the fourth number of disabled user profiles is more than the third threshold number, trigger a fourth alert that indicated detection of a fourth DoS attack on multiple user profiles during the second time interval.

16. The non-transitory computer-readable medium of claim 15, wherein the instructions further cause the processor to disable a user profile from among the plurality of user profiles in response to determining that a number of invalid sign-on attempts on the user profile within a threshold time period exceeds a threshold number of invalid sign-on attempts.

17. The non-transitory computer-readable medium of claim 16, wherein the instructions further cause the processor to:
- combine the fourth number of disabled user profiles and the fifth number of disabled user profiles;
- determine whether the combination of the fourth number of disabled user profiles and the fifth number of disabled user profiles is more than a fourth threshold number, wherein the fourth threshold number is associated with the second time interval; and
- in response to determining that the combination of the fourth number of disabled user profiles and the fifth number of disabled user profiles is more than the fourth threshold number, trigger a fifth alert that indicates detection of a fifth DoS attack on multiple user profiles during the first time interval and the second time interval.

\* \* \* \* \*